United States Patent
Caldwell et al.

(10) Patent No.: US 10,192,191 B2
(45) Date of Patent: *Jan. 29, 2019

(54) SYSTEMS AND METHODS FOR MANAGING INFORMATION ASSOCIATED WITH BOXES USED IN THE DELIVERY OF PACKAGES

(71) Applicant: FedEx Corporate Services, Inc., Collierville, TN (US)

(72) Inventors: Mark E Caldwell, Memphis, TN (US); Erika J Raeth, Germantown, TN (US); James S Staggs, Eads, TN (US); Kevin B Reasons, Germantown, TN (US)

(73) Assignee: FEDEX CORPORATE SERVICES, Collierville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/942,724

(22) Filed: Apr. 2, 2018

(65) Prior Publication Data

US 2018/0225621 A1  Aug. 9, 2018

Related U.S. Application Data

(63) Continuation of application No. 15/621,531, filed on Jun. 13, 2017, now Pat. No. 9,965,738, which is a continuation of application No. 14/583,957, filed on Dec. 29, 2014, now abandoned, which is a continuation of application No. 13/524,499, filed on Jun. 15, 2012, now Pat. No. 8,947,254.

(51) Int. Cl.
| | |
|---|---|
| *H04W 4/33* | (2018.01) |
| *G06Q 10/08* | (2012.01) |
| *H04L 29/08* | (2006.01) |
| *H04W 4/04* | (2009.01) |
| *H04W 4/80* | (2018.01) |
| *H04W 4/40* | (2018.01) |

(52) U.S. Cl.
CPC .......... *G06Q 10/083* (2013.01); *G06Q 10/08* (2013.01); *H04L 67/12* (2013.01); *H04W 4/046* (2013.01); *H04W 4/33* (2018.02); *H04W 4/40* (2018.02); *H04W 4/80* (2018.02)

(58) Field of Classification Search
CPC ....... G06Q 10/083; G06Q 10/08; H04W 4/33; H04W 4/80; H04L 67/12
USPC ...................................... 340/691.6
See application file for complete search history.

(56) References Cited

U.S. PATENT DOCUMENTS

| | | | | |
|---|---|---|---|---|
| 5,818,336 A | * | 10/1998 | Varga | ........... A47G 29/1207 340/545.1 |
| 2002/0082994 A1 | | 6/2002 | Herziger | |
| 2005/0154602 A1 | * | 7/2005 | Hertz | ..................... G06Q 10/08 345/540 |
| 2007/0192189 A1 | | 8/2007 | Popowich et al. | |

(Continued)

*Primary Examiner* — Kerri L McNally
(74) *Attorney, Agent, or Firm* — Finnegan, Henderson, Farabow, Garrett & Dunner, LLP

(57) ABSTRACT

There is disclosed methods and systems for managing drop boxes. Events reflecting outputs from one or more sensors are detected. Information that is a function of the detected event is forwarded to a drop box management system. This information, along with additional information received by the drop box management system, is utilized to generate instructions including display instructions for each drop box. Displays of drop boxes are then updated based on the instructions.

20 Claims, 5 Drawing Sheets

(56) References Cited

U.S. PATENT DOCUMENTS

2008/0067227 A1\* 3/2008 Poss .................... A47G 29/22
                                                    232/17
2011/0137484 A1   6/2011 Poss et al.
2013/0051314 A1\* 2/2013 Ong ..................... H04W 88/06
                                                    370/328

\* cited by examiner

SYSTEMS AND METHODS FOR MANAGING INFORMATION ASSOCIATED WITH BOXES USED IN THE DELIVERY OF PACKAGES

CROSS REFERENCE TO RELATED APPLICATION(S)

This application is a continuation application of, and claims priority to, U.S. patent application Ser. No. 15/621,531, filed Jun. 13, 2017 (now allowed), which is a continuation application of and claims priority to, U.S. patent application Ser. No. 14/583,957, filed Dec. 29, 2014 (abandoned), which is a continuation of, and claims priority to U.S. patent application Ser. No. 13/524,499, filed Jun. 15, 2012 (issued as U.S. Pat. No. 8,947,254), all of which are incorporated herein by reference in their entirety.

TECHNICAL FIELD

The present disclosure generally relates to the field of managing information associated with boxes used in the delivery of packages, including boxes referred to as "drop boxes," which delivery services use to enable customers to drop off and secure packages intended for pickup by a courier at a later time and subsequent delivery by the service to a destination. Additionally, the disclosure relates to systems and methods for displaying delivery service information on displays of drop boxes.

BACKGROUND INFORMATION

Courier services use boxes to enable customers to drop off and secure packages intended for pickup by a courier at a later time and subsequent delivery of the packages by the service to a destination. These boxes are often referred to as "drop boxes." Many courier services provide drop boxes in a variety of locations so that customers are able to conveniently ship items.

Drop boxes utilize decals to display delivery service information, including, for example, scheduled pickup times when a courier is scheduled to pick up any packages at the drop boxes, marketing messages, and holiday and other temporary pickup time changes. These decals are usually physically applied by couriers or drop box installers. Human error can sometimes lead to incorrect decals being installed or the decals not being installed at all. Additionally, decals become outdated, for example, decals indicating pickup times during a holiday season may not be properly removed, leading to inaccurate information being provided to customers. Furthermore, the decals may simply fade and would have to be monitored regularly. These and other concerns with the use of decals on drop boxes may lead to packages not being shipped as intended.

SUMMARY

In accordance with the disclosed embodiments, there is provided a method comprising: detecting an event reflecting output from one or more sensors associated with each drop box from one or more drop boxes; outputting drop box information from each drop box to a drop box management system as a function of the event; receiving information at the drop box management system, the information comprising drop box information from the one or more drop boxes or location information reflecting travel of one or more couriers; generating instructions for a respective drop box from the one or more drop boxes based on the received information; providing the instructions to the respective drop box; receiving the instructions at the respective drop box; and dynamically updating a display associated with the respective drop box as a function of drop box output information outputted by the respective drop box and the instructions received from the drop box management system.

In accordance with the disclosed embodiments, there is further provided a computer-readable storage medium storing one or more programs, the one or more programs comprising instructions that, when executed by a computing device, cause the device to: detect an event reflecting output from one or more sensors associated with each drop box from one or more drop boxes; output drop box information from each drop box to a drop box management system as a function of the event; receive information at the drop box management system, the information comprising drop box information from the one or more drop boxes or location information reflecting travel of one or more couriers; generate instructions for a respective drop box from the one or more drop boxes based on the received information; provide the instructions to the respective drop box; receive the instructions at the respective drop box; and dynamically update a display associated with the respective drop box as a function of drop box output information outputted by the respective drop box and the instructions received from the drop box management system.

In accordance with disclosed embodiments, there is further provided a system comprising: a one or more drop boxes and a drop box management system, wherein each drop box from the set of drop boxes and the drop box management system comprise one or more processors, the one or more processors configured to: detect an event reflecting output from one or more sensors associated with each drop box from the one or more drop boxes; output drop box information from each drop box to the drop box management system as a function of the event; receive information at the drop box management system, the information comprising drop box information from the one or more drop boxes or location information reflecting travel of one or more couriers; generate instructions for a respective drop box from the one or more drop boxes based on the received information; provide the instructions to the respective drop box; receive the instructions at the respective drop box; and dynamically update a display associated with the respective drop box as a function of drop box output information outputted by the respective drop box and the instructions received from the drop box management system.

It is to be understood that both the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this specification, illustrate the disclosed embodiments and, together with the description, serve to explain the principles of the disclosed embodiments.

DETAILED DESCRIPTION

Figure 1:
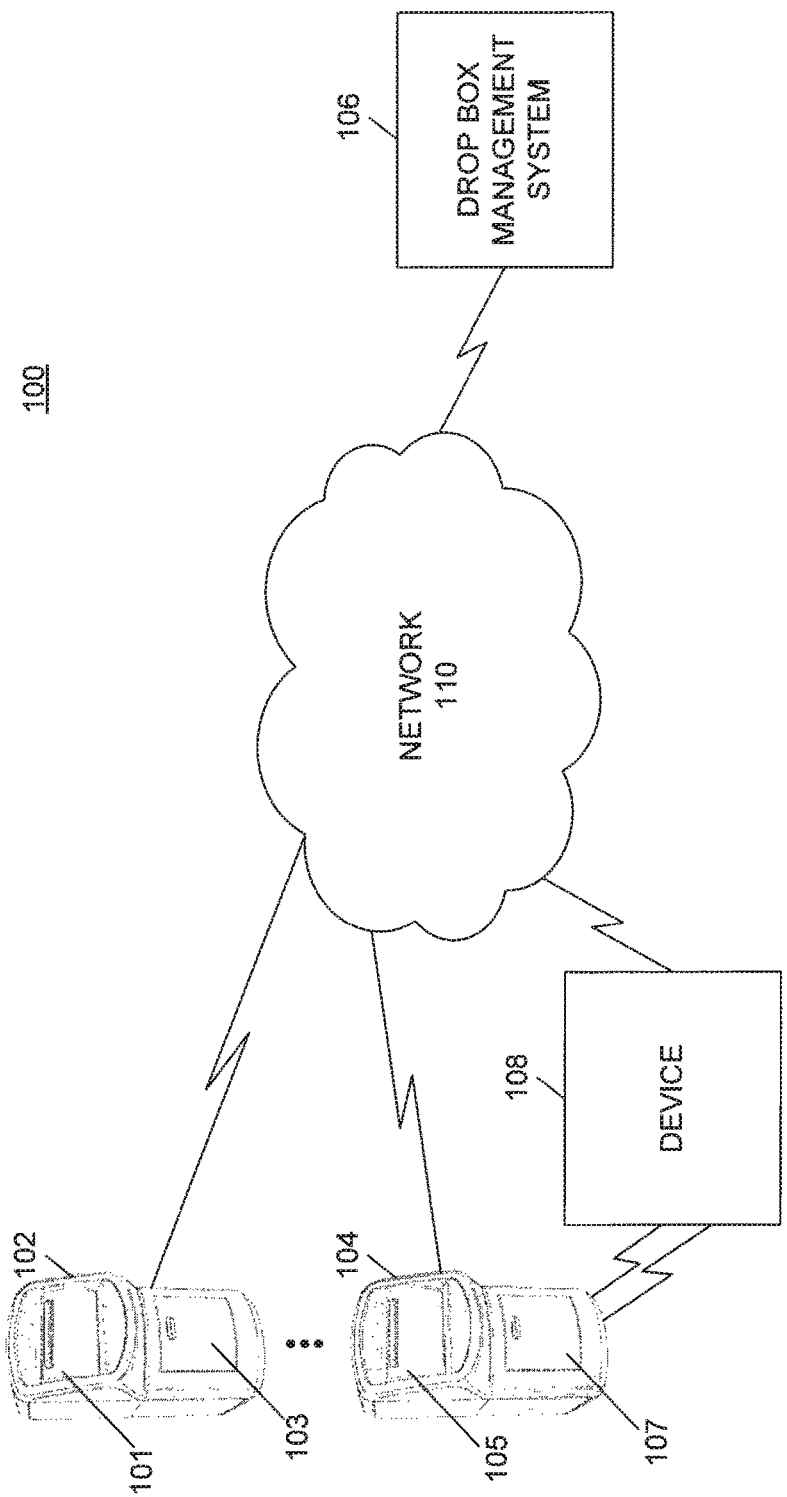
FIG. 1 illustrates an exemplary system for managing information regarding drop boxes.

The disclosed embodiments generally relate to managing information regarding a status of components in drop boxes. Customers are provided updated and/or more accurate service information on displays associated with the drop boxes. Additionally, monitoring the status of components in drop boxes allows for more efficient management of drop box resources, such as replenishing supplies that customers use in connection with the delivery process, including envelopes, packaging, and forms.

In accordance with some embodiments, one or more sensors are placed within or proximate to a drop box. Each sensor is configured to sense an aspect or event associated with one or more of the components of the drop box. Sensor event information may be compiled or used independently to trigger a notification to a drop box management system, which is configured to provide a further notification designed to address the triggering event(s). For example, one or more sensors may sense when a package bin is full, the battery is low, the display is not working, the courier door of a drop box is left open, or scan a barcode. This sensor event information may be relayed to the drop box management system. As a function of this information and instructions from the drop box management system, a display on or proximate to the drop box may be changed to reflect the sensor event information. In other words, either independent or in consideration of any instructions from the drop box management system, information output on a particular drop box's display is updated. For example, if the bin is full, the display may specify a "bin full" condition, and optionally, the display may provide an alternative drop-off location and the alternative may be identified in accordance with instructions from the management system.

The drop box management system, according to some embodiments, may receive information from drop boxes. The drop box management system has the benefit of receiving information from a set of drop boxes as well as information reflecting travel of couriers between destinations and information input into the drop box management system through other sources. For example, if a courier is running behind schedule for a pickup at a drop box, the drop box management system may update a display of a particular drop box to indicate the expected pickup time or may provide this pickup time through an interface, like email or the Internet, to customers. In another example, a marketing department may use the drop box management system to provide drop box displays with information on marketing campaigns, available discounts, and the like, and a dispatcher may use the drop box management system to manage other aspects of the drop boxes.

In some embodiments, based on the received information, the drop box management system may generate instructions for the drop boxes and other entities. For example, the drop box management system may generate instructions containing display information for each of the drop boxes. Alternatively, it may generate a task order to be transmitted to a courier device or any other relevant entity. For example, if it is indicated that supplies are low in a particular drop box, there may be a task order created to replenish supplies in the particular drop box. Similarly, if a battery is low, a task order to replace the battery may be created and sent to a maintenance individual.

These instructions are then communicated to the drop box. For example, display information may be transmitted to a drop box in the form of instructions on the information to display. Based on the received instructions or sensor information, a drop box may adjust components within the drop box. For example, based on instructions containing display information, a display of the drop box may be updated. Alternatively, the display may also be updated based on information that is a function of a detected event which reflects a status of a component. For example, if a sensor senses that a courier door has been left open for a threshold period of time, which may indicate that it has been left open by mistake, the display may indicate that the drop box is no longer accepting packages in order to preserve the security of potential shipments.

As used herein, the term "courier" is intended to apply broadly to a person, device, or vehicle configured to deliver, pick up, or otherwise participate in the delivery of a package.

Reference will now be made in detail to exemplary embodiments, examples of which are illustrated in the accompanying drawings. Wherever possible, the same reference numbers will be used throughout the drawings to refer to the same or like parts.

FIG. 1 illustrates a system 100 for managing information related to components in drop boxes. System 100 may include drop boxes 102 and 104, drop box management system 106, and/or courier device 108, connected via network 110.

Drop boxes 102 and 104 contain one or more bins, including, for example, a bin within the drop box 102, 104 that is configured to hold envelopes, packages, and the like deposited for delivery, and a bin that is configured to hold supplies available to customers for shipping. According to some embodiments, couriers pick up envelopes, packages, and the like deposited in drop boxes for delivery. Some couriers may carry a device 108 configured to enable communication among the courier, a central dispatcher, one or more drop boxes, or other sources associated with the delivery service. Drop box 102 includes a display 101 and a courier door 103. Similarly, drop box 104 includes a display 105 and a courier door 107. Courier doors 103, 107 may provide access to one or more bins within drop boxes 102, 104, respectively. Network 110 may be a shared, public, or private network, may encompass a wide area or local area, and may be implemented through any suitable combination of wired and/or wireless communication networks. Network 110 may be a General Packet Radio Service (GPRS) core network, a Code Division Multiple Access (CDMA) core network, or any other network that allows for the exchange of data, messages, and other information. Alternatively, network 110 may comprise a local area network (LAN), a wide area network (WAN), an Intranet, or the Internet. In some embodiments, device 108 may be paired directly with either of drop boxes 102 or 104 utilizing a Bluetooth connection. Alternatively, near field communication technology, radio frequency-identification technology, or bar code related technology may be utilized to pair device 108 with drop boxes 102 or 104. Device 108 may provide and acquire data from the drop box 102 or 104 that it is paired to. In some embodiments, the Bluetooth pairing function may additionally lead to automatically opening up a courier door 103 or 107 on either drop box 102 or 104, respectively.

Device 108 may be used to scan packages that are picked up from drop boxes 102, 104. Information related to the scanned packages may be relayed back to drop box management system 106, which may share this information with all entities associated with the delivery service, including sales, dispatcher, etc. Device 108 may also collect data regarding event information from one or more sensors in drop box 102 or 104 when it is paired (or electronically communicating directly) with device 108. For example, device 108 may collect data from sensors in drop box 102 that a package bin is empty, and this information may then be communicated to the drop box management system 106 by the device 108. Components of the drop box may include displays, courier doors, batteries, one or more bins, etc., for example, display 101 and courier door 103 in drop box 102.

Furthermore, device 108 may be configured to permit tracking using a Global Positioning System (GPS), triangulation, or any other method. Knowing the location of courier device 108 allows drop box management system 106 to determine whether the associated courier is in transit to a designated drop box 102 or 104 and any estimated delays. Accordingly, drop box management system 106 provides accurate and timely information regarding pickup times.

System 100 is exemplary, and the number and distribution of the various entities shown may be different depending on specific embodiments. For example, the components in system 100 may be combined and/or distributed over multiple entities, including other computers, handheld computers, mobile phones, tablet computers, or other computing platforms. Thus, the configuration described in system 100 is exemplary only and is not intended to be limiting.

Figure 2:
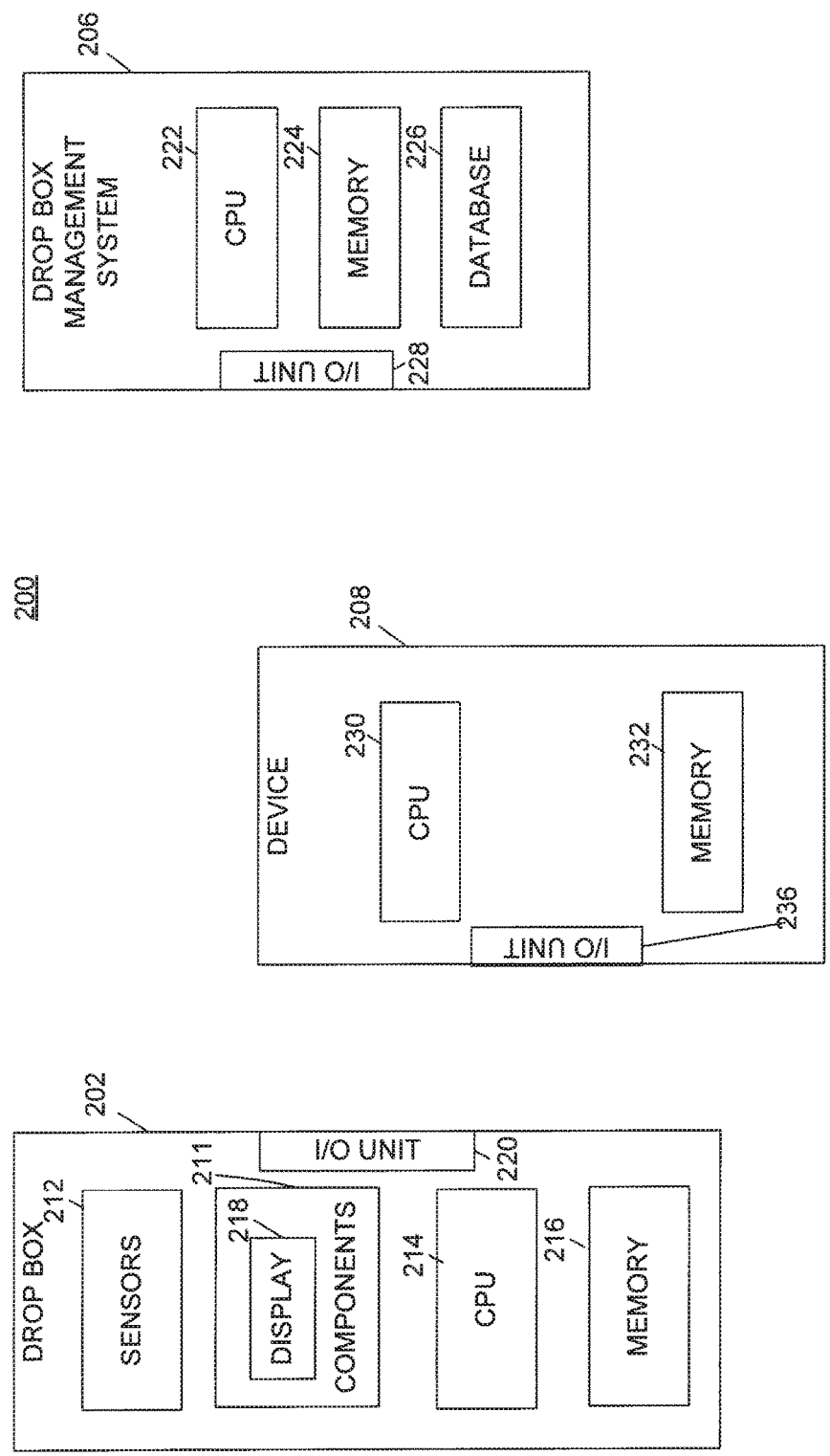
FIG. 2 illustrates devices of an exemplary system for managing information regarding drop boxes

FIG. 2 illustrates devices of an exemplary system 200 for managing information related to components of drop boxes. System 200 may include drop box 202, drop box management system 206, and device 208. Drop box 202 may be similar to drop boxes 102 and/or 104 from FIG. 1, drop box management system 206 may be similar to drop box management system 106, and device 208 may be similar to device 108. Drop box 202, drop box management system 206, and device 208 may include general-purpose computing components configured to execute special-purpose instructions or code to perform certain actions. In some embodiments, drop box 202 may be set at a location permanently or temporarily. Regardless, the computing components of drop box 202 are configurable as needed to adjust to the set location.

Drop box 202 may include sensors 212, which may include one or more software and/or hardware components for sensing events or aspects associated with components 211 of drop box 202. Components 211 of drop box 202 may include display 218 (similar to displays 101 and 105, as shown in FIG. 1), courier doors (similar to courier doors 103 and 107, as shown in FIG. 1), batteries, solar panels, and one or more bins, etc. For example, sensors 212 may sense that a bin from components 211 is full in drop box 202. Components 211 and corresponding sensors 212 may be present inside, coupled to, or be in the periphery of drop box 202.

Display 218 is configured to display information, including pickup times, marketing information, information associated with other drop boxes, or other information based on detection of an event reflecting output from sensors 212. For example, if a bin (not illustrated) for holding packages is full, and an event is detected reflecting an output from that sensor in sensors 212 that senses that a bin is full, it may be displayed on display 218 that the bin is full, and a location and pickup times for the closest drop box may then be displayed.

Drop box 202 includes a central processing unit (CPU) 214 and a memory 216 to process data, such as the sensed data or received data. CPU 214 may include one or more processors configured to execute computer program instructions to perform various processes and methods. CPU 214 may read the computer program instructions from memory 216 or from any computer-readable medium. Memory 216 may include random access memory (RAM) and/or read only memory (ROM) configured to access and store information and computer program instructions. Memory 216 may also include additional memory to store data and information, and/or one or more internal databases to store tables, lists, or other data structures.

Drop box 202 may include an I/O unit 220 for sending data over a network or any other medium. For example, I/O unit 220 may send data over a Bluetooth connection, a network, a point-to-point connection, and/or a point-to-multipoint connection, either wirelessly or over a cable.

Drop box management system 206 may include a CPU 222 and/or a memory 224, which may be similar to CPU 214 and memory 216 from drop box 202. Drop box management system 206 may also include a database 226. Database 226 may store large amounts of data, and may include a magnetic, semiconductor, tape, optical, or other type of storage device. In some embodiments, database 226 may store information to be accessed by various entities in a courier service network that may have access to drop box management system 206. Drop box management system 206 may include an I/O unit 228 for communicating with drop box 202 or device 208. I/O unit 228 may be similar to I/O unit 220 on drop box 202.

Device 208 may include a CPU 230 and/or a memory 232, which may be similar to CPU 214 and memory 216 from drop box 202. Device 208 may include an I/O unit 236 for communicating with drop box 202 or drop box management system 206. I/O unit 236 may be similar to I/O unit 220 on drop box 202.

System 200 is exemplary only, and the number and distribution of the various entities shown may be different depending on specific embodiments. For example, in some embodiments, drop box 202 may not include sensors 212, CPU 214, memory 216, and/or display 218. In some embodiments, drop box management system 206 may be distributed over multiple entities, including other distribution systems, computers, handheld computers, tablet computers, or other computing platforms. Thus, the configuration described in system 200 is exemplary only and is not intended to be limiting.

Figure 3:
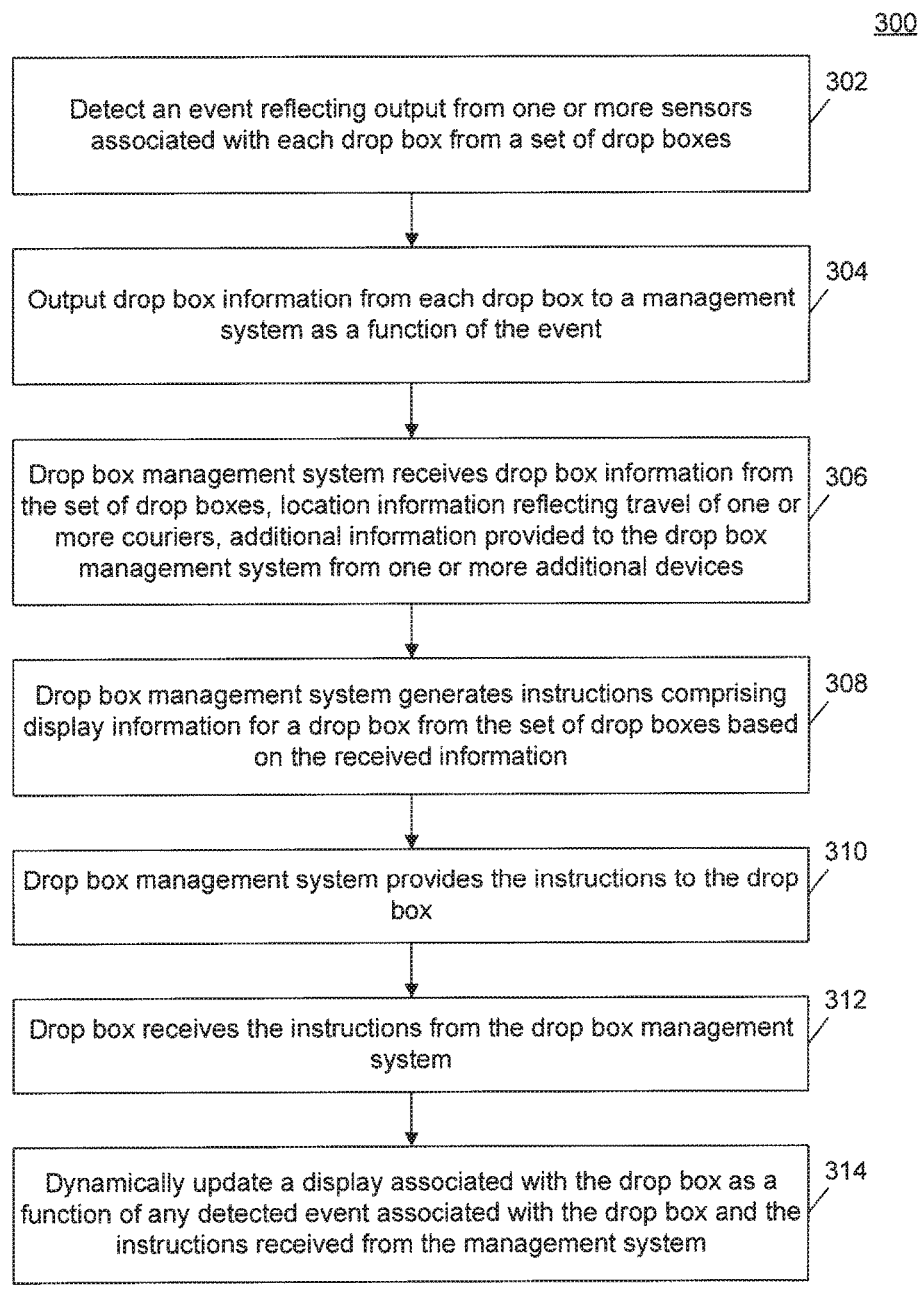
FIG. 3 illustrates the operations of an exemplary method performed by a system for managing drop boxes.

FIG. 3 illustrates the operations of an exemplary method 300 performed by components of systems 100 and 200 for managing information. Method 300 may be executed by CPUs 214, 202, and/or 230. Method 300 may also be performed in conjunction with other components not shown in systems 100 and 200. As explained, some steps in method 300 are optional and may be rearranged. Additional steps may also be added to method 300.

First, an event may be detected reflecting output from one or more sensors associated with each drop box from a set of drop boxes (step 302). For example, a bin which contains supplies in drop box 102 may become empty. An event is detected reflecting an output from the sensor in sensors 212 that indicates that the bin is empty (that is, the trigger for a sensor is that the bin is empty; when the sensor determines that the bin is empty, it provides an output).

In some embodiments, the one or more sensors associated with a drop box correspond to one or more components of the drop box. For example, sensors 212, which are associated with drop box 102, correspond to components 211.

Components 211 may include a supply bin that holds shipping supplies, a package collection bin in which packages are deposited by customers, and a courier door that provides access to the package collection bin so that a courier may remove the packages. Additional components may include a rechargeable battery, solar panels coupled to drop box 102 to charge the rechargeable battery, label printers, or any additional components which may be included in drop box 102. Similarly, an event may be detected reflecting output from one or more sensors associated with drop box 104.

Next, drop box information may be output from each drop box to a management system as a function of the event (step 304). For example, drop box 102 and drop box 104 may output the drop box information to drop box management system 106 as a function of the event detected in step 302. Continuing from step 302, drop box 102 may output drop box information to drop box management system 106 that the bin is empty. Alternatively, it may output drop box information to drop box management system 106 that the bin is empty along with a request to replenish the supplies.

Next, the drop box management system may receive drop box information from the set of drop boxes, location information reflecting travel of one or more couriers, or additional information provided to the drop box management system from one or more additional devices (step 306). For example, drop box management system 106 may receive drop box information that is a function of a detected event reflecting output from one or more sensors associated with drop box 102 or 104, information related to travel movements of couriers based on a tracking mechanism as discussed above, or one or more additional devices may provide additional information to drop box management system 106. In some embodiments, the one or more additional devices may be devices utilized by sources that are part of the delivery service, for example, users within a sales, marketing, or dispatching department.

Next, the drop box management system may generate instructions comprising display information for a drop box from the set of drop boxes based on the received information (step 308). For example, instructions comprising display information may be generated for drop box 102 in drop box management system 106.

In some embodiments, the display information includes information reflecting detection of events in the drop box, secondary drop box information associated with another drop box from the set of drop boxes, pickup times associated with the drop box, and marketing information.

As an example with respect to information reflecting detection of events in the drop box, display information for drop box 102 may be associated with output drop box information from drop box 102. Continuing from step 304, if in step 306, drop box management system 106 receives information that a bin which contains supplies is empty in drop box 102, the display information may be generated to indicate that there are no supplies available and display a forecasted time when the supplies may be replenished.

As an example with respect to secondary drop box information associated with another drop box from the set of drop boxes, information associated with drop box 104 may include pickup times associated with drop box 104 and the location of drop box 104.

Examples of marketing information may include holiday pickup times, sales, or any additional advertisement information that may be included in the instructions sent by drop box management system 106. This information may be provided to drop box management system 106 utilizing one or more additional devices that may be a part of the display information.

In some embodiments, information comprising display information may be collectively generated for multiple drop boxes. For example, instructions to display marketing information may be received by drop box management system 106 from one or more additional devices. The instructions may entail displaying the information by all of the drop boxes managed by drop box management system 106. Accordingly, information may be generated for each respective drop box at the same time, for example, drop boxes 102 and 104.

Next, the drop box management system may provide instructions to the drop box (step 310). For example, drop box management system 106 may provide instructions comprising display instructions to drop box 102 if they are generated for drop box 102. Alternatively, instructions may be provided to drop box 104 if they are generated for drop box 104.

Next, the drop box may receive the instructions from the drop box management system (step 312). For example, instructions generated for drop box 102 by drop box management system 106 are received by drop box 102.

Next, the drop box may dynamically update a display associated with the drop box as a function of the output information and any instructions from the drop box management system (step 314). For example, drop box 102 may dynamically update display 101 as a function of the drop box status information that it output or any instructions from drop box management system 106. For example, if an event is detected reflecting output from a sensor in sensors 212 that a bin is empty in drop box 102, then display 101 may be dynamically updated to indicate that the bin is empty based on detection of the event. Alternatively, display 101 may display a location of the nearest drop box after receiving instructions from drop box management system 106, for example, drop box 104 where packages may be dropped off.

In some embodiments, drop box management system 106 may provide the instructions to drop box 102 though device 108. For example, drop box management system 106 provides instructions for drop box 102 to device 108 through the network 110. When courier device 108 pairs with drop box 102 utilizing a Bluetooth connection, it transfers these instructions to drop box 102.

Similarly, device 108 may retrieve or receive information and/or data from drop boxes 102 and 104 when paired with either of them through a Bluetooth connection. Thereafter, it may transfer the information and/or data to drop box management system 106.

In some additional embodiments, the drop box management system may generate a notification based on detection of an event in a drop box and create a task order to physically alter conditions of the respective drop box based on the notification. For example, drop box information from drop box 102 may indicate that a battery level of a battery in drop box 102 is low. Accordingly, a notification may be generated and, based on the notification, a task order may be created to replace the battery. This task order may be sent to a courier or maintenance entity either through device 108 or by any additional means utilized by the delivery service for maintenance means.

Figure 4:
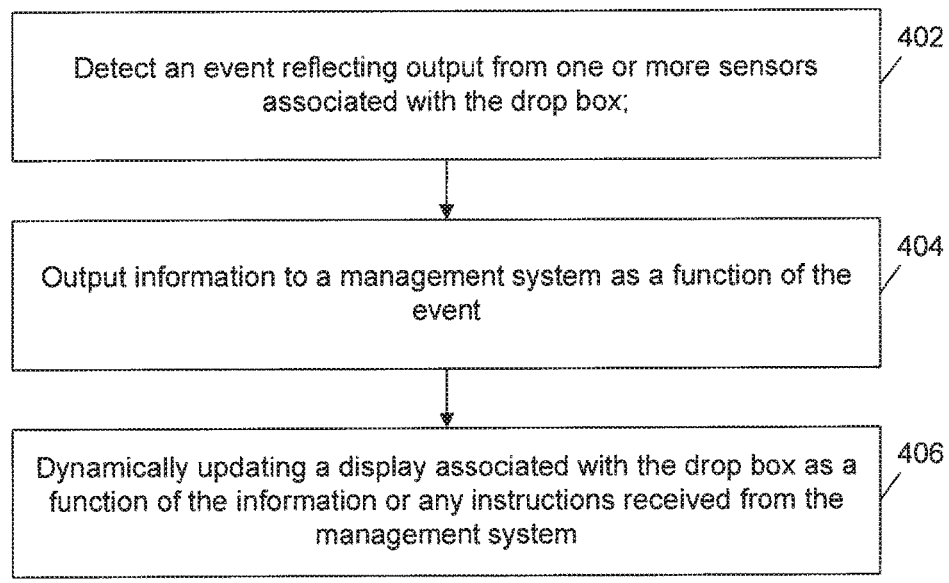
FIG. 4 illustrates the operations of an exemplary method performed by a drop box for managing information.

FIG. 4 illustrates the operations of an exemplary method 400 that may be performed by drop box 102 for managing information. Method 400 may be executed by CPU 214 on drop boxes 102 and 202. Method 400 may also be performed in conjunction with other components shown or not shown in systems 100 and 200. As explained, in some implementations, some steps in method 400 are optional and may be rearranged. Additional steps may also be added to method 400.

First, an event may be detected reflecting output from one or more sensors associated with the drop box (step 402). For example, a bin which contains supplies in drop box 102 may become empty. An event is detected reflecting an output from a sensor in sensors 212 that indicates that the bin is empty (that is, the trigger for a sensor is that the bin is empty; when the sensor determines that the bin is empty, it provides an output).

In some embodiments, the one or more sensors associated with a drop box may correspond to one or more components of the drop box. For example, sensors 212, which are associated with drop box 102, correspond to components 211.

Components 211 may include a supply bin which holds shipping supplies, a package collection bin in which packages are deposited by customers, and a courier door that provides access to the package collection bin so that a courier may remove the packages. Additional components may include a rechargeable battery, solar panels coupled to drop box 102 to charge the rechargeable battery, or any additional components which may be included in drop box 102. Similarly, an event may be detected reflecting output from one or more sensors 212 associated with drop box 104.

Next, information may be output to a management system as a function of the event (step 404). For example, drop boxes 102 and 104 may output the drop box information to drop box management system 106 as a function of the event detected in step 402. Continuing from step 402, drop box 102 may output drop box information to drop box management system 106 that the bin is empty. Alternatively, it may output drop box information to drop box management system 106 that the bin is empty along with a request to replenish the supplies.

Next, a display associated with the drop box may be dynamically updated as a function of the information or any instructions received from the management system (step 406). For example, drop box 102 may dynamically update display 101 as a function of the information that it output or any instructions from drop box management system 106. For example, if an event is detected reflecting output from a sensor in sensors 212 that a bin is empty in drop box 102, then display 101 may be dynamically updated to indicate that the bin is empty based on detection of the event. Alternatively, display 101 may display a location of the nearest drop box after receiving instructions from drop box management system 106, for example, drop box 104 where packages may be dropped off.

In some embodiments, display 101 displays information associated with the status of the components of drop box 102, pickup times for drop box 102, information associated with another drop box 104, or marketing information. The information associated with the another drop box 104 may include pickup times for drop box 104, status components in drop box 104, and the location of drop box 104. Furthermore, marketing information may include holiday pickup times, sales, or any additional advertisement information that may be included in the instructions sent by drop box management system 106.

Figure 5:
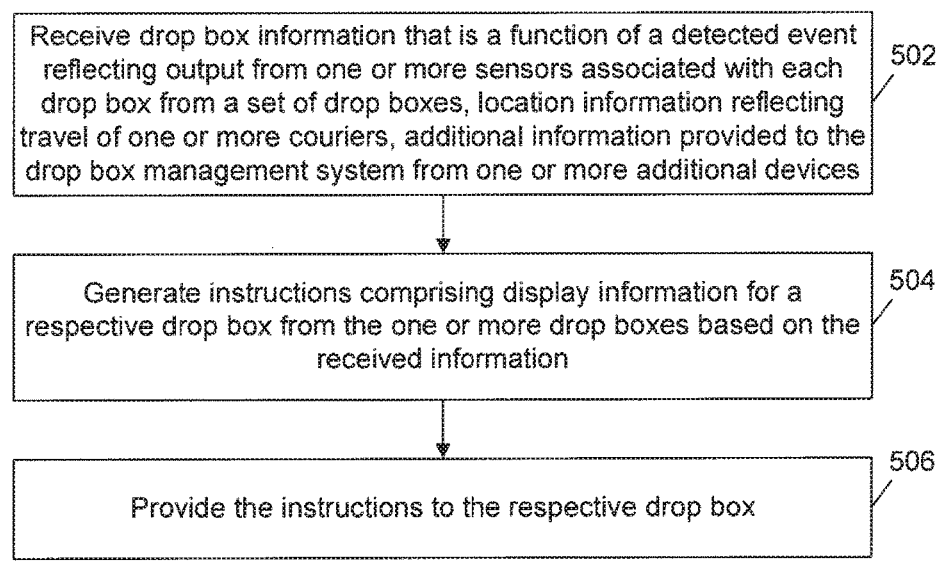
FIG. 5 illustrates the operations of an exemplary method performed by a drop box management system for processing information.

FIG. 5 illustrates the operations of an exemplary method 500 performed by drop box management systems 106 and 206 for managing information. Method 500 may be executed by CPU 222 on drop box management system 206. Method 500 may also be performed in conjunction with other components not shown in system 100 and 200. As explained, some steps in method 500 are optional and may be rearranged. Additional steps may also be added to method 500.

First, the drop box management system may receive drop box information that is indicating a detected event reflecting output from one or more sensors associated with each drop box from a set of drop boxes, location information reflecting travel of one or more couriers, or additional information provided to the drop box management system from one or more additional devices (step 502). For example, drop box management system 106 may receive drop box information which is a function of a detected event reflecting output from one or more sensors associated with drop box 102 or 104, information related to travel movements of couriers based on a tracking mechanism as discussed above, or one or more additional devices (not illustrated) may provide additional information to drop box management system 106. In some embodiments, the one or more additional devices (not illustrated) may be devices utilized by sources that are part of the delivery service, for example, users within a sales, marketing, or dispatching department.

Next, the drop box management system may generate instructions comprising display information for a drop box from the set of drop boxes based on the received information (step 504). For example, instructions comprising display information may be generated for drop box 102 in drop box management system 106.

In some embodiments, the display information may include information reflecting detection of events in the drop box, secondary drop box information associated with another drop box from the set of drop boxes, pickup times associated with the drop box, and marketing information.

As an example with respect to information reflecting detection of events in the drop box, display information for drop box 102 may be associated with output drop box information from drop box 102. Continuing from step 504, if in step 506, drop box management system 106 receives information that a bin which contains supplies is empty in drop box 102, the display information may be generated to indicate that there are no supplies available and display a forecasted time when the supplies may be replenished.

As an example with respect to secondary drop box information associated with another drop box from the set of drop boxes, information associated with drop box 104 may include pickup times associated with drop box 104 and the location of drop box 104.

Examples of marketing information may include holiday pickup times, sales, or any additional advertisement information that may be included in the instructions sent by drop box management system 106. This information may be provided to drop box management system 106 utilizing one or more additional devices that may be a part of the display information.

In some embodiments, information comprising display information may be collectively generated for multiple drop boxes. For example, instructions to display marketing information may be received by drop box management system 106 from one or more additional devices. The instructions may entail displaying the information by all of the drop boxes managed by drop box management system 106. Accordingly, information may be generated for each respective drop box at the same time, for example, drop boxes 102 and 104.

Next, the drop box management system may provide the instructions to the drop box (step 506). For example, drop box management system 106 may provide instructions comprising display instructions to drop box 102 if they are generated for drop box 102. Alternatively, instructions may be provided to drop box 104 if they are generated for drop box 104.

The embodiments and all of the functional operations described in this specification may be implemented in digital electronic circuitry, or in computer software, firmware, or hardware, including the structures disclosed in this specification and their structural equivalents, or in combinations of them. The embodiments may be implemented as one or more computer program products, i.e., one or more modules of computer program instructions encoded on a computer-readable medium, e.g., a machine-readable storage device, a machine-readable storage medium, a memory device, or a machine-readable propagated signal, for execution by, or to control the operation of, data processing apparatus.

The term "data processing apparatus" encompasses all apparatus, devices, and machines for processing data, including, by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one computer or on multiple computers that may be located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special-purpose logic circuitry, e.g., a field programmable gate array (FPGA) or an application specific integrated circuit (ASIC).

Processors suitable for the execution of a computer program may include, by way of example, both general and special-purpose microprocessors, and any one or more processors of any kind of digital computer. Generally, a processor may receive instructions and data from a ROM or a RAM or both. The essential elements of a computer may include a processor for executing instructions and one or more memory devices for storing instructions and data. Generally, a computer may also include, or be operatively coupled to, a communication interface to receive data from or transfer data to, or both, one or more mass storage devices for storing data, e.g., magnetic, magneto optical disks, or optical disks.

Moreover, a computer may be embedded in another device, e.g., a mobile telephone, a personal digital assistant (PDA), a mobile audio player, or a Global Positioning System (GPS) receiver, to name just a few. Information carriers suitable for embodying computer program instructions and data may include all forms of nonvolatile memory, including, by way of example, semiconductor memory devices, e.g., EPROM, EEPROM, and flash memory devices; magnetic disks, e.g., internal hard disks or removable disks; magneto optical disks; and CD ROM and DVDROM disks. The processor and the memory may be supplemented by, or incorporated in, special-purpose logic circuitry.

To provide for interaction with a user, embodiments of the invention may be implemented on a computer having a display device, e.g., a cathode ray tube (CRT) or liquid crystal display (LCD) monitor, for displaying information to the user, and a keyboard and a pointing device, e.g., a mouse or a trackball, by which the user may provide input to the computer. Other kinds of devices may be used to provide for interaction with a user as well, for example, feedback provided to the user may be any form of sensory feedback, e.g., visual feedback, auditory feedback, or tactile feedback; and input from the user may be received in any form, including acoustic, speech, or tactile input.

The embodiments may be implemented in a computing system that may include a back-end component, e.g., as a data server, or that may include a middleware component, e.g., an application server, or that may include a front-end component, e.g., a client computer having a graphical user interface or a Web browser through which a user may interact with an implementation of the invention, or any combination of such back-end, middleware, or front-end components. The components of the system may be interconnected by any form or medium of digital data communication, e.g., a communication network. Examples of communication networks include a local area network (LAN) and a wide area network (WAN), e.g., the Internet.

The computing system may include clients and servers. A client and server are generally remote from each other and typically interact through a communication network. The relationship of client and server arises by virtue of computer programs running on the respective computers and having a client/server relationship to each other.

Certain features which, for clarity, are described in this specification in the context of separate embodiments may also be provided in combination as a single embodiment. Conversely, various features which, for brevity, are described in the context of a single embodiment may also be provided in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Particular embodiments have been described. Other embodiments are within the scope of the following claims.

What is claimed is:

1. A drop box comprising:
 a display;
 a memory device that stores a set of instructions; and
 at least one processor that executes the set of instructions to perform a method, including:

transmitting to a wireless device associated with a courier, information from the drop box reflecting an event associated with the drop box;
receiving from the wireless device instructions responsive to the event; and
dynamically updating the display based on the instructions received from the wireless device.

2. The drop box of claim 1, further including at least one sensor configured to detect the event.

3. The drop box of claim 2, further including:
a power source;
a bin configured to receive one or more packages; and
a courier door associated with the bin.

4. The drop box of claim 3, wherein the at least one sensor is configured to detect a status of at least one of the bin, the power source, or the courier door.

5. The drop box of claim 4, wherein the at least one sensor may be configured to detect whether the bin is full or empty.

6. The drop box of claim 4, wherein the at least one sensor may be configured to detect whether the courier door is open.

7. The drop box of claim 1, wherein the event is associated with at least one of a quantity of shipping supplies associated with the drop box, or a power level of a battery associated with the drop box.

8. The drop box of claim 1, wherein the instructions are generated by a drop box management system associated with the wireless device.

9. A method for managing information associated with a drop box, comprising:
detecting an event associated with the drop box;
transmitting to a wireless device associated with a courier, information from the drop box reflecting the event;
receiving from the wireless device instructions responsive to the event; and
dynamically updating a display associated with the drop box based on the instructions received from the wireless device.

10. The method of claim 9, further including:
transmitting, by the wireless device, the information to a drop box management system; and
receiving, at the wireless device, the instructions responsive to the event from the drop box management system.

11. The method of claim 10, further including:
establishing, by the wireless device, a wireless connection with the drop box, the wireless connection being at least one of a Bluetooth connection or a near field communication connection; and
receiving, at the wireless device, information via the wireless connection.

12. The method of claim 9, wherein detecting the event includes receiving information reflecting the event from at least one sensor associated with the drop box.

13. The method of claim 9, wherein the instructions include instructions for updating the display to reflect information associated with another drop box.

14. The method of claim 13, wherein the information associated with the other drop box includes at least one of a pickup time associated with the other drop box, a detected event associated with the other drop box, or a location of the other drop box.

15. The method of claim 9, wherein the instructions include instructions for updating the display to reflect an updated pickup schedule associated with the drop box.

16. The method of claim 9, wherein the instructions include instructions for displaying marketing information on the display.

17. The method of claim 9, wherein the instructions include instructions for displaying a forecasted time for replenishing supplies in the drop box.

18. The method of claim 9, wherein the instructions include a task order generated by the drop box management system.

19. The method of claim 18, wherein the event indicates that a quantity of shipping supplies associated with the drop box is less than a threshold; and
the task order includes instructions to restock the shipping supplies.

20. The method of claim 18, wherein:
the event indicates that a power level of a battery associated with the drop box is less than a threshold; and
the task order includes instructions to replace the battery.

* * * * *